April 21, 1964     F. F. MONACO ETAL     3,130,288

FOOD-SERVICE DEVICE

Filed Nov. 21, 1961

FOSTER MONACO
ROSARIO MONACO
*INVENTORS.*

BY

AGENT

United States Patent Office 3,130,288
Patented Apr. 21, 1964

3,130,288
FOOD-SERVICE DEVICE
Foster F. Monaco, 246—06 Cullman Ave., Little Neck, N.Y., and Rosario R. Monaco, 3325 90th St., Jackson Heights, N.Y.
Filed Nov. 21, 1961, Ser. No. 153,963
3 Claims. (Cl. 219—43)

Our invention relates to food-service devices such as trays, bowls, pans and the like.

In the past, food-service devices have been expensive, easily broken, quickly tarnished, difficult to keep sanitary and inconvenient to use. In addition, they have offered little or no heat protection.

The need for such devices has rapidly increased by reason of changing eating habits. More often than ever before, families are cooking in the kitchen and eating elsewhere, as, for example, in the living room or on the patio. In addition, the trend is toward the reheating of previously cooked foods and away from the eating of just-cooked meals.

Accordingly, it is an object of the invention to provide a device which will cheaply and conveniently protect food from the environment during and prior to serving.

A more particular object of the invention is to provide means in a server for heating food to and/or maintaining it at an elevated temperature preparatively to serving.

Another object of the invention is to provide a food-service device with means for simultaneously storing a variety of foods in separate, readily accessible and conveniently removable compartments.

A further object of the invention is to provide a food-service device which at all times enables visual inspection of the several food compartments without requiring exposure of their contents to extensive contact with the atmosphere.

Still a further object of the invention is to provide a food-service device which will not easily be broken in use and which will protect users from possible injury.

In accordance with our present invention we provide a preferably portable serving device forming at least one open-topped receptacle with double bottom and a removable, preferably hinged cover, the double bottom encompassing a space for the accommodation of a temperature-maintaining fluid such as a thermally insulating air cushion or a bath of hot or cold water. The receptacle may be a unitary body composed of two concave shells rigidly interconnected along their peripheries while being slightly separated elsewhere to define an air space, it being understood that this space could also be partly evacuated. It is also possible, however, to constitute the receptacle as a pan with a peripheral ledge having one or more trays, dishes or similar containers suspended therefrom, the lower surfaces of these containers being elevated above the bottom of the pan to define the afore-mentioned fluid space therewith; in that instance it will be possible to fill that space with a suitable liquid to a level above the undersides of the containers so as to maintain the contents thereof at a desired temperature.

The serving device, or at least the cover thereof, is advantageously made of a transparent, preferably plastic material. A particularly desirable cover configuration includes a domed portion having the general configuration of a semi-ellipsoid.

The foregoing and other objects and features of our invention will become more fully apparent from the following description of several embodiments thereof, given in conjunction with the accompanying drawing in which.

In accomplishing the above objects, it has been found most satisfactory to construct the food-service device from a tough, shatter-resistant transparent plastic such as methyl methacrylate (commonly marketed under the trade names Lucite and Plexiglas). Other polyacrylic plastics have also been found quite satisfactory. The use of plastic minimizes the possibility of breakage, thus protecting users from possible injury.

A food-service device of this type is especially useful for serving bakery or meat products. Depending upon the particular food served as well as other factors, the plastic chosen will vary. It may be a crystal-clear or a colored transparent resin. In the latter instance a green tint has been found particularly satisfactory from an esthetic viewpoint.

Figure 1:
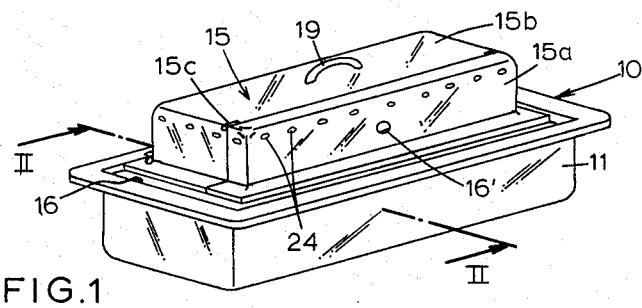
FIG. 1 is a perspective view of an embodiment of the invention.
Figure 2:
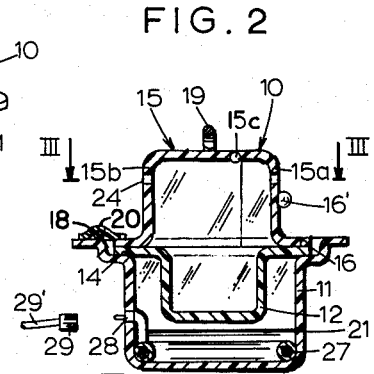
FIG. 2 is a sectional view taken along line II—II of FIG. 1.
Figure 3:
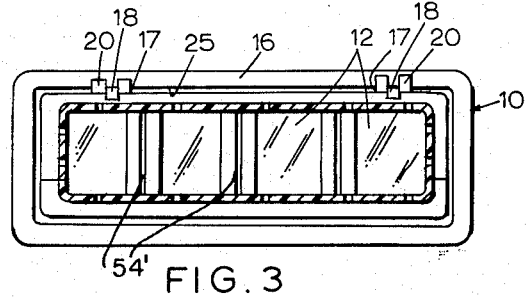
FIG. 3 is a sectional view taken on the line III—III of FIG. 2.

In FIGS. 1–3 the reference numeral 10 generally designates the food-service device of one embodiment of the invention. The device 10 comprises a deep pan 11 in which are placed a number of smaller, tray-shaped containers 12. The trays 12 are not as deep as pan 11 and are supported on an inner ledge 14 of the pan. In this embodiment of the invention, four removable inner trays are shown by way of example.

The two end trays are supported on three sides, while the inner trays are supported on two sides. A removable cover 15 rests on top of integral ledges 16 of the trays 12 as shown more clearly in FIG. 2. Cover 15 is provided with pins 17 which are carried by lugs 20 and are detachably receivable by snap hinges 18 disposed along edge 25 of pan 11. A handle 19, preferably made of chrome or stainless steel, is screwed or riveted to the top of cover 15. The cover may be swung out by that handle or removed from the hinges 18 by a transverse pull to the front of the device, i.e., to the right as viewed in FIG. 2. The ledges 16 thus constitute spaced-apart formations interposed between the cover member 15 and the inner-vessel members 12.

Cover 15 is shown composed of two parts 15a, 15b hinged together at 15c. A knob 16' on front part 15a of cover 15 enables this part to be lifted for closer inspection or sampling of the contents of trays 12 with only limited exposure.

The pan 11, which is impervious to liquids, serves for the storage of a temperature-controlling material or fluid such as a water bath 21. The device 10 also incorporates a heating element 27 here shown as an immersion-type resistance coil enclosed in a waterproof, generally U-shaped shield. Heater 27 is placed on the bottom of the pan 11 along its periphery. Its flexibility allows it to conform to almost any desired shape. It is attached to an electrical plug 28 mounted in a lower wall portion of the pan 11. The exterior of the plug 28 is connected to a socket 29 attached to an electric cord 29' whose other end is receivable in the usual type of wall socket. When the heating device is not in use, the extension cord is conveniently removed.

In operation, the pan 11 is first filled with water 21 to the desired level below the tops of the removable trays 12 to be nested therein. The water, if not already at the necessary temperature, is then heated by means of heater 27 whereupon the trays 12 with their food content are immersed therein. The cord 29' may now be disconnected as the water maintains the food hot while the device 10 is carried around, e.g., to the various tables of a dining room, during serving. Vent holes 24 in cover 15 facilitate the escape of steam which rises from the bath between the slightly spaced-apart trays 12.

Figure 4:
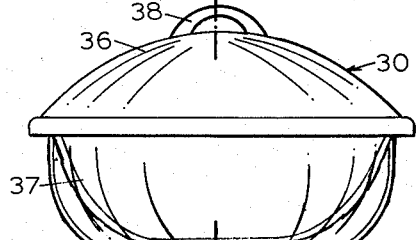
FIG. 4 is a perspective view of an alternative embodiment of the invention.
Figure 5:
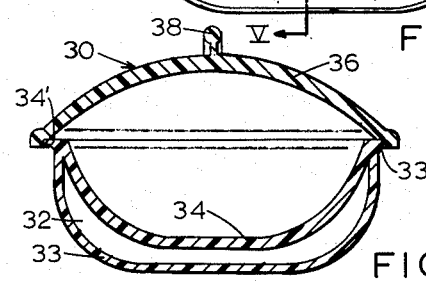
FIG. 5 is a sectional view taken along line V—V of FIG. 4.

The device 30 shown in FIGS. 4 and 5 comprises a domed cover 36 of generally semi-ellipsoidal configuration and a bowl 37. A handle 38 integrally molded on the cover 36, e.g., of the type disclosed in U.S. Patents Nos. 2,688,156 and 2,820,683, issued September 7, 1956, and January 21, 1957, to Foster Monaco, one of the present applicants, enables its removal from the bowl. No heating element need be employed in this device in which the water bath of the preceding embodiment is replaced by an air space 32 between the upwardly concave shells 33, 34 constituting the double-bottomed bowl 37. These shells are cemented or otherwise bonded together along their edges 33' and 34', with or without prior evacuation of some of the air from space 32. The food is received in the concavity of the upper shell 34 and retains its temperature for a long time since it is effectively insulated from the surrounding atmosphere by the space 32 below and by the air mass within the dome-shaped cover 36 above.

Figure 7:
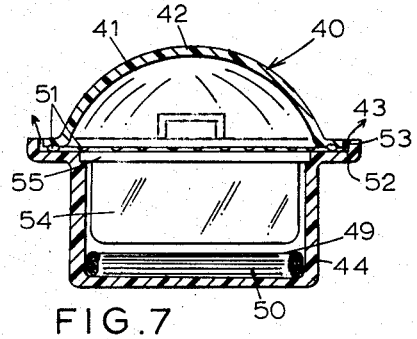
FIG. 7 is a section taken along line VII—VII of FIG. 6.
Figure 6:
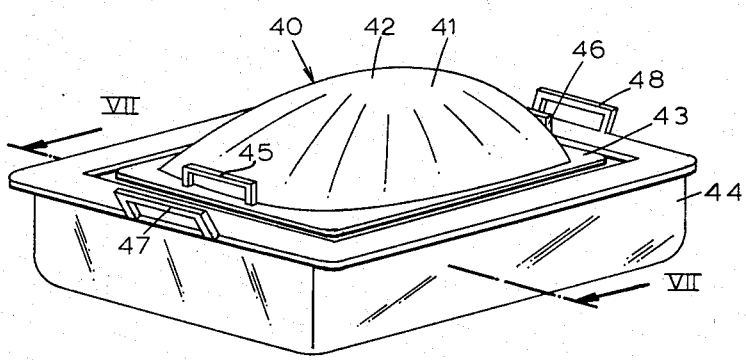
FIG. 6 is a perspective view of still another embodiment of the invention.

The device 40 shown in FIGS. 6 and 7 comprises a cover 41 with a domed center portion 42 integrally framed by a planar flange 43 of generally rectangular outline. The cover 41 is removably placed on a receptacle 44, similar to pan 11 of FIGS. 1–3, and has two handles 45, 46 rising from flange 43 at the minor sides of the rectangle. Receptacle 44 may be independently transported by means of two handles 47, 48 attached to opposite edges thereof. The bath 49 in pan 44 may be heated by any convenient means such as a plastic tape 50 with imbedded resistance wires connectable to a source of current in a manner not further illustrated, e.g., as described for the element 27 of FIGS. 1–3. The tape 50 is heat-sealed or otherwise bonded to the inner wall of the pan along its circumference.

As clearly seen in FIG. 7, cover 41 is formed along the underside of its flange 43 with spaced-apart projections 51, such as metallic grommets partly imbedded therein, which maintain this flange slightly spaced from the peripheral ledge 52 of pan 44 on which it rests. Since the flange 43 fits with clearance inside the peripheral bead 53 of pan 44, and since the vessels 54 suspended therein from a shoulder 55 are horizontally spaced apart to a certain extent (e.g., by gaps 54') as illustrated in FIG. 3 for the similar containers 12, steam from the bath 49 can escape outwardly between the grommets 51 and around the flange 43 as indicated by the arrows in FIG. 7.

It is to be understood that our invention is not limited to the specific configurations described and illustrated and that various modifications thereof, including combinations and substitutions of compatible features from different embodiments herein disclosed, are possible without departing from the spirit and scope of the invention as defined in the appended claims. Thus, for example, thermoplastic or thermosetting materials other than those specifically mentioned may be used for the receptacles and their covers; also, if desired, a cooling medium (e.g., ice water) may be employed in lieu of a heating fluid in the embodiments of FIGS. 1–3 and 6, 7.

We claim:

1. A display-type food-service receptacle comprising an upwardly open outer vessel of transparent material formed with an upper edge having an outwardly extending, generally horizontal peripheral flange; a plurality of upwardly open inner vessels of transparent plastic material removably nested within said outer vessel, said inner vessels having bottom portions spaced from the bottom of said outer vessel and engaging it along said flange while being spaced from the remainder of said outer vessel to form therewith fluid spaces surrounding said inner vessels for controlling the temperature of food therewithin, said outer vessel constituting a pan accommodating a water bath to a level above said bottom portions of said inner vessels; a generally dome-shaped cover of transparent material removably disposed above said inner vessels, said cover having a peripheral edge overlying said flange in a closed condition of said receptacle, said flange forming a supporting surface for said cover, said cover being provided with horizontally spaced downwardly extending projections bearing upon said supporting surface for enabling the ventilation of said vessels and said spaces.

2. A device according to claim 1, further comprising heater means in said outer vessel for elevating the temperature of said water bath.

3. A device according to claim 1 wherein the material of said cover is plastic and said projections are metallic elements partly imbedded in the plastic material of said cover.

References Cited in the file of this patent

UNITED STATES PATENTS

| | | |
|---|---|---|
| 120,995 | O'Sullivan | Nov. 14, 1871 |
| 246,720 | Campbell | Sept. 6, 1881 |
| 521,119 | Linter | June 5, 1894 |
| 586,005 | Black | July 6, 1897 |
| 933,136 | Sternan | Sept. 7, 1909 |
| 1,003,112 | Johnson | Sept. 12, 1911 |
| 1,455,395 | Exum | May 15, 1923 |
| 1,677,276 | Deicken | July 17, 1928 |
| 1,698,914 | Kircher | Jan. 15, 1929 |
| 2,076,173 | Cocks | Apr. 6, 1937 |
| 2,187,196 | Douglass | Jan. 16, 1940 |
| 2,428,996 | Schworm | Oct. 14, 1947 |
| 2,507,425 | Swartout | May 9, 1950 |
| 2,520,543 | Hawkins | Aug. 29, 1950 |
| 2,550,998 | Hilliker | May 1, 1951 |
| 2,588,614 | Capra | Mar. 11, 1952 |
| 2,713,111 | McCreary | July 12, 1955 |
| 2,818,794 | Aslesen | Jan. 7, 1958 |
| 2,908,382 | Turner | Oct. 13, 1959 |
| 2,944,694 | Kinsey | July 12, 1960 |
| 3,020,113 | Molitor | Feb. 6, 1962 |

FOREIGN PATENTS

| | | |
|---|---|---|
| 566,188 | Great Britain | Dec. 18, 1944 |